Patented Sept. 5, 1950

2,520,913

UNITED STATES PATENT OFFICE 2,520,913

PHENOLIC MOLDING RESINS

Thomas F. Clark, Peoria, Ill., assignor to the United States of America as represented by the Secretary of Agriculture No Drawing. Application January 24, 1947, Serial No. 724,216

1 Claim. (Cl. 260—17.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to an improved process of making phenol-aldehyde thermosetting plastic molding compounds. It relates in particular, to the preparation of condensation products of phenols with aldehydes in admixture with or for admixture with lignin concentrates, in particular those obtained by acid hydrolysis, that is, saccharification, of wood.

The usual practice in preparing resinous compositions for use in thermosetting plastic molding compounds has comprised the following operations: (1) Condensation, at elevated temperatures with and without pressure, of phenols with aldehydes, usually formaldehyde, in the presence of acidic or alkaline catalysts; (2) neutralization of the condensation product; (3) dehydration of the condensate under vacuum conditions at elevated temperatures; and (4) pulverizing the cooled and hardened dehydrated product. In this method, non-volatile substances used as catalysts, or their products of neutralization, remain in the resinous mass, as do also low-molecular-weight polymers which are water soluble. Low-molecular-weight polymers and other water-soluble substances, including neutralized catalytic agents, are detrimental to the quality of the resin for use in thermosetting molding compounds.

In my method phenols or mixtures of phenols with or without a treated lignin concentrate, the lignin concentrate being a product of acid-saccharification of lignocellulosic materials, hereafter called saccharification lignin, are caused to condense in the presence of acidic or alkaline catalytic agents at elevated temperatures with formaldehyde. Progress of the condensation may be followed, after separation of the condensation mixture into resinous and aqueous phases, by the decrease in concentration of the formaldehyde in the aqueous phase. At the end of a period known to produce a desired product or when the formaldehyde content has decreased to a predetermined concentration, the resinous mass may be separated from the aqueous phase by allowing the resin to flow from the reactor in a manner analogous to that used when separating two immiscible liquids of different specific gravities in a laboratory separatory funnel. This and subsequent operations constitute novel features.

The molten resinous material removed from the reactor may be caused to flow directly to a dough mixer or masticator which contains water and a neutralizing agent for the condensation catalyst. A slight excess of the neutralizing agent causes no deleterious effects since this material will be removed in subsequent operations. After a period of mixing in the dough mixer, the aqueous portion is removed and replaced by fresh water. Mixing or washing is continued until granulation of the resin occurs; usually two to three washings are sufficient. At this stage the resin will be in particles of approximately 8- to 10-mesh size and finer. The mixing and washing operation may be a displacement by a continuous flow of fresh water, in which case the discharge water should flow through filter screens within the mixer thereby keeping suspended particles of resin in the mixer. Either continuous or batch washing may be employed, the latter method permitting some economies in water consumption. Should a resin of greater fineness be desired, this may be produced by wet grinding in ball mills or in burr mills. The finely ground resin is recovered by filtration and air dried. The filtration may be accomplished on drum filters, the resin being washed, air-blown, and recovered as flakes subject to crumbling. The resin may then be dried in a current of air at room temperature.

The following are examples of the preparation and recovery of the resin, compounding, and results of tests on molded specimens when this new technique was employed.

Example I

A resin was condensed from the following: Cresylic acid, broad cut, 120 grams; phenol, 250 grams; formaldehyde solution, 37 percent by weight, 460 grams; and concentrated sulfuric acid, 1.44 cc. in 20 cc. of water.

The formaldehyde solution and catalyst were added when the phenolics were at a temperature of 40° C. The temperature was increased to 90° C. in 45 minutes. The period allowed for condensation was 2 hours and 45 minutes after turbidity developed. The resinous fraction was transferred to a laboratory-size, one quart, Baker-Perkins mixer containing distilled water and calcium hydroxide sufficient to give a pH value of 8.0 to 9.0. After 10 minutes mixing the water solution was decanted from the resin and the washing operation repeated. Granulation occurred during the third washing operation. The granulated resin was transferred to a pebble mill, and the resin wet ground in the presence of calcium hydroxide. The finely ground resin was recovered by filtration through a Buchner funnel, washed several times with distilled water, then air-dried at temperatures between 18° and 32° C. A suspension of 1 gram of the powdered resin in 50 ml. of distilled water had a pH value of 7.4.

When this resin was compounded with lignin obtained by the saccharification of corncobs and other materials in the proportions stated below, flexural strength ranging from approximately 9,700 p. s. i. to 11,370 p. s. i. and water absorption on 15-minute immersion of 0.21 to 0.27 percent were observed: Lignin, saccharification, −80 mesh, 50 percent; resin, 44.5 percent; hexamethylenetetramine, 4.5 percent; calcium hydroxide, 0.5 percent; and calcium stearate, 0.5 percent.

The mixture was milled on differential rolls at 220° and 230° F. and then ground to 16 to 20 mesh before molding. Moldings of flexural specimens, ¼ x ¼ x 2½ inches, were made from electronically heated preforms. Bar specimens were molded at 350° F. under a pressure of 3,000 p. s. i. for a period of 4 minutes. The samples used in the boiling water absorption tests were broken flexural specimens, the fractured ends of which were ground smooth to avoid pockets in which water might remain. Twenty-eight millimeter bottle caps subjected to the same boiling water test exhibited absorption of 0.39 percent.

Example II

A resin was prepared from the following: Cresylic acid-treated saccharification lignin (40 parts cresylic acid and 60 parts lignin), 272.4 grams; phenol, 225 grams; and formaldehyde solution, 37 percent $CH_2O$ by weight, 414 grams.

Approximately 30 hours at 90° C. were allowed for the condensation reaction. The resinous product was ground and washed in a pebble mill without the mixing in a Baker-Perkins mixer as in Example I. Calcium hydroxide was used as before to maintain the pH between 7.0 and 8.0. The resin was then filtered, washed with water, and air-dried as in Example I.

When this resin was compounded with 50-percent corncob flour and 4.5-percent hexamethylenetetramine, the balance of the mixture, 45.5 percent, being resin, the flexural strength of specimens molded in the flash-type mold and under the condition in Example I ranged from 10,500 p. s. i. with no preheat, to 10,845 p. s. i. with a 90-second preheat in a high frequency heater.

Example III

A resin was prepared from the same ingredients as in Example II and in the same proportions, except that in this example ammonium hydroxide was added as a condensation catalyst. About 0.13 mol of ammonium hydroxide were used per mol of combined or total phenols. Five hours at 90° C. was allowed for condensation. Grinding and washing was done in a pebble mill without addition of calcium hydroxide. The washed and air-dried resin had a pH value of 5.5. A molding compound containing 50-percent corncob flour and 50-percent resin exhibited flexural values of 8,745 p. s. i. to 9,895 p. s. i. when specimens were molded from preforms preheated electronically from 0 to 90 seconds.

Example IV

The formulation of resin used in this experiment is similar to that of Example I. The period of condensation was 3¾ hours at 90° C. The resinous condensation product was transferred to a Baker-Perkins mixer and washed with lime water (pH 8.0–9.0). Granulation occurred during the second wash. The resin was transferred to a pebble mill and wet ground in the presence of calcium hydroxide. The finely ground resin was collected and washed with distilled water on a Büchner funnel, then air dried at a temperature not exceeding 32° C. A suspension of 1 gram of resin in 50 ml. distilled water had a pH value of 7.0.

When this resin was compounded with 50 percent of −80-mesh saccharification lignin, 4.5 percent of hexamethylenetetramine, 0.5 percent of calcium hydroxide, and 0.5 percent of calcium stearate, the resulting compound exhibited molded flexural strengths ranging from 9,600 p. s. i. to 12,660 p. s. i. from preforms preheated electronically for periods ranging from 120 to 240 seconds. Specimens were molded 4 minutes at 350° F. under a pressure of 3,000 p. s. i. in a flash-type mold producing specimens ¼ x ¼ x 2½ inches. Water absorption on 15-minute immersion in boiling water was 0.20 to 0.24 percent for broken bar specimens and 0.44 percent for 28-millimeter bottle closures molded for 2½ minutes. The pH value of a suspension of the compound was 7.4.

The lignin concentrate is obtained by saccharification of agricultural lignocellulosic residues, such as corncobs, by the process described by J. W. Dunning and E. C. Lathrop in "Industrial and Engineering Chemistry," volume 37, pages 24–29 (1945). The lignin content of the concentrate is approximately 50 percent or greater. The degraded cellulosics represent about one third of the concentrate. A small percentage of the undetermined balance is ash. The pH value of the recovered concentrate, which has been washed before drying, determined electrometrically on a suspension of 1 gram of concentrate in 50 milliliters of distilled water was 3.7. The lignin concentrate employed, as described above in plastic molding compounds, has been ball mill ground to pass an 80-mesh U. S. standard sieve.

The cresylic acid-treated saccharification lignin employed in Example II was prepared by mixing 60 parts of the lignin concentrate with 40 parts of cresylic acid and heating the mixture at approximately 160° to 190° C. A stiff paste-like mass is obtained in a period of 30 minutes to 8 hours.

The process is applicable to other aldehydes, for example, to furfuraldehyde.

Among the phenols that are employed are phenol, para-tertiary amyl phenol, ortho-, meta-, or para-cresols, mixtures of these cresols, and mixtures with other phenols.

Having thus described my invention, I claim:

A process comprising heating phenol and formaldehyde in the presence of an acidic catalyst to yield a molten thermosetting plastic molding material, washing and mixing the molten material with water in the presence of a neutralizing agent for the catalyst and for a sufficient time and in such manner that the water-soluble low molecular weight polymers are removed and so that granulation occurs, washing the granules with water to remove neutralized catalyst, separating the aqueous phase, drying the granules at a temperature not above about 32° C. to obtain a resin having a pH of about 7 to 7.4, mixing said resin with a lignin concentrate, obtained by acid saccharification of lignocellulose, and with hexamethylenetetramine in a catalytic and minor amount, and with a minor amount of calcium hydroxide, and compounding the mixture by milling and heat.

THOMAS F. CLARK.

REFERENCES CITED

The following references are of record in the file of this patent:

UNITED STATES PATENTS

| Number | Name | Date |
|---|---|---|
| 1,475,446 | Pollak | Nov. 27, 1923 |
| 2,156,160 | Olson | Apr. 25, 1939 |
| 2,197,724 | Hovey | Apr. 16, 1940 |
| 2,221,778 | Collings | Nov. 19, 1940 |

FOREIGN PATENTS

| Number | Country | Date |
|---|---|---|
| 148,264 | Great Britain | Sept. 30, 1919 |
| 288,228 | Great Britain | Feb. 15, 1929 |